(12) United States Patent
Kelly

(10) Patent No.: US 6,678,095 B2
(45) Date of Patent: Jan. 13, 2004

(54) ANAMORPHIC OPTICAL SYSTEM

(75) Inventor: Shawn L. Kelly, Commerce Township, MI (US)

(73) Assignee: Visual Systems Research, Inc., Waterford, MI (US)

( * ) Notice: Subject to any disclaimer, the term of this patent is extended or adjusted under 35 U.S.C. 154(b) by 79 days.

(21) Appl. No.: 09/995,034

(22) Filed: Nov. 27, 2001

(65) Prior Publication Data

US 2002/0063975 A1 May 30, 2002

Related U.S. Application Data

(60) Provisional application No. 60/253,233, filed on Nov. 27, 2000, provisional application No. 60/269,114, filed on Feb. 15, 2001, and provisional application No. 60/298,259, filed on Jun. 12, 2001.

(51) Int. Cl.[7] ............................................. G02B 13/10
(52) U.S. Cl. ..................... 359/669; 359/832; 359/837
(58) Field of Search ........................... 359/831, 832, 359/837, 668, 669, 670, 671

(56) References Cited

U.S. PATENT DOCUMENTS

| | | | |
|---|---|---|---|
| 504,890 A | 9/1893 | Ohmart | |
| 2,307,210 A | 1/1943 | Goldsmith | 348/832 |
| 2,780,142 A | 2/1957 | Bouwers | 359/669 |
| 3,006,241 A | 10/1961 | Marks et al. | 353/10 |
| 3,832,046 A | 8/1974 | Mecklenborg | 352/69 |
| 4,017,160 A | 4/1977 | Betensky | |
| 4,129,365 A | 12/1978 | Aversano et al. | 353/99 |
| 4,173,399 A | 11/1979 | Yevick | 353/78 |
| 4,327,968 A | 5/1982 | Yevick | 359/834 |
| 4,913,528 A | 4/1990 | Hasegawa | 359/638 |
| 4,953,956 A | 9/1990 | Carpenter | |
| 5,159,491 A | 10/1992 | Richards | 359/641 |
| 5,373,395 A | * 12/1994 | Adachi | 359/652 |
| 5,596,456 A | 1/1997 | Luecke | 359/831 |
| 5,610,771 A | 3/1997 | Sigler | 359/832 |
| 5,636,069 A | 6/1997 | Nightingale et al. | 359/831 |
| 5,805,340 A | 9/1998 | Kelly | 359/574 |
| 5,862,001 A | 1/1999 | Sigler | 359/832 |
| 6,038,089 A | * 3/2000 | Maruyama et al. | 359/837 |
| 6,115,181 A | 9/2000 | Kelly | 359/618 |
| 6,128,119 A | * 10/2000 | Kamikubo | 359/204 |

OTHER PUBLICATIONS

M. Hart, "Solving the Mysteries of MGM Camera 65 and Ultra Panavision 70" Reprinted from Wide Gage File and Video Monthly, Marshall Multimedia, L.L.C., vol. 1, No. 7, 1996, Revised Aug. and Dec. 1997, Internet Document printed on Nov. 24, 2001 from http://www.widescreenmuseum.com/widescreenj/c65story.htm, 6 pages.

MGM Camera 65 Ultra Panavision: Internet Document printed on Nov. 24, 2001 from http://www.widescreenmuseum.com/widescreenj/wingup1.htm, 5 pages.

(List continued on next page.)

*Primary Examiner*—Mark A. Robinson
(74) *Attorney, Agent, or Firm*—Dinnin & Dunn, P.C.

(57) ABSTRACT

A pair of prisms arranged in a complementary relationship provides for anamorphic magnification and cooperates with a curved refractive element, the later of which generates an aberration that at least partially compensates an aberration generated by the pair of prisms. Examples of the curved refractive element include, but are not limited to, a cylindrical lens, a curved substrate of optical material, a pair of counter-rotatable cylindrical lenses, a fluid-filled cylindrical lens with variable power incorporating a substrate that is deformed by a clamp mechanism over a fulcrum or curved surface, and at least one curved surface of fixed or variable curvature of the prisms, the later of which may be fluid-filled. In one embodiment, a color image is generated as a composite of images from different image modulators, each modulating a different color, and chromatic aberration is compensated by electronically scaling or shifting images from different image modulators differently.

20 Claims, 6 Drawing Sheets

OTHER PUBLICATIONS

MGM Camera 65 Ultra Panavision: Internet Document printed on Nov. 24, 2001 from http://www.widescreenmuseum.com/widescreenj/wingup2.htm, 7 pages.

MGM Camera 65 Ultra Panavision: Internet Document printed on Nov. 24, 2001 from http://www.widescreenmuseum.com/widescreenj/wingup3.htm, 4 pages.

MGM Camera 65 Ultra Panavision: Internet Document printed on Nov. 24, 2001 from http://www.widescreenmuseum.com/widscreenj/wingup4.htm, 5 pages.

MGM Camera 65 Ultra Panavision: Internet Document printed on Nov. 24, 2001 from http://www.widescreenmuseum.com/widescreenj/wingup5.htm, 4 pages.

* cited by examiner

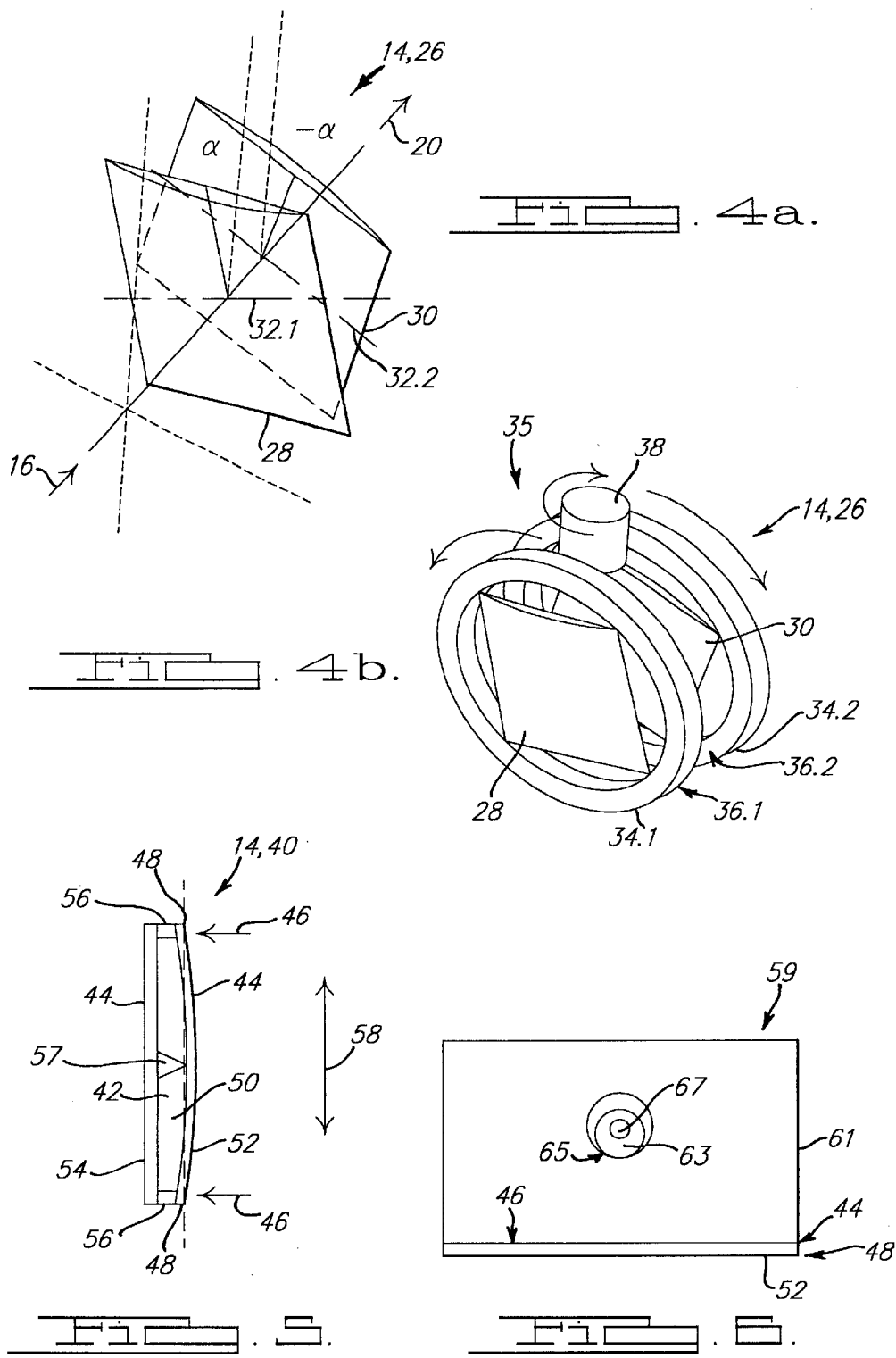

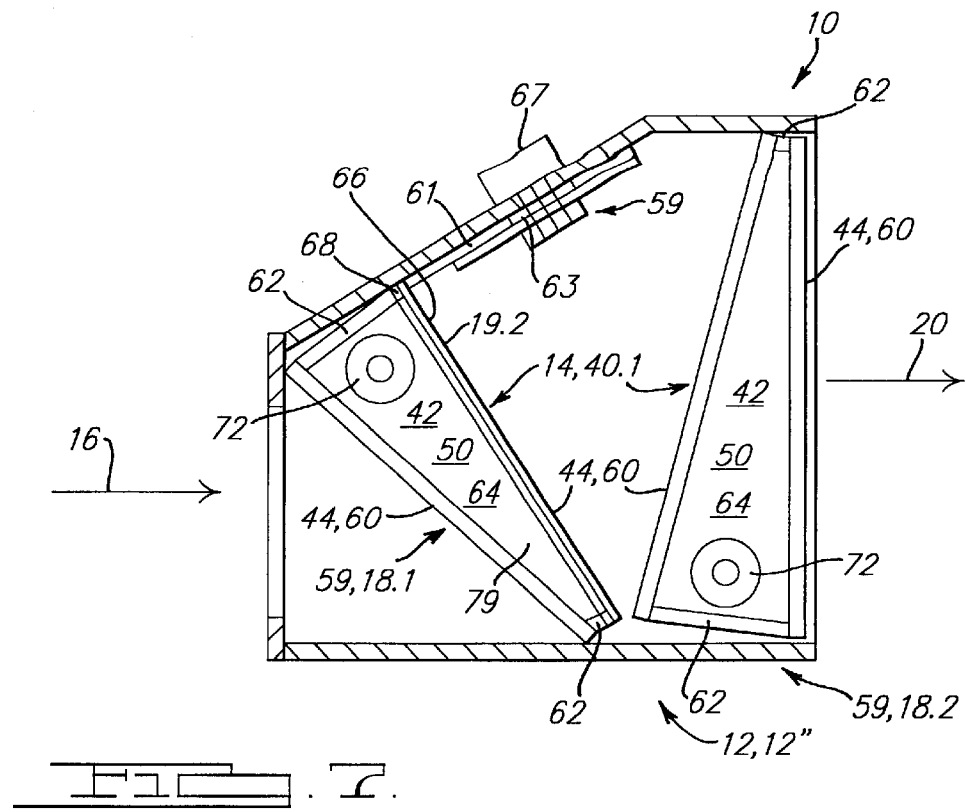
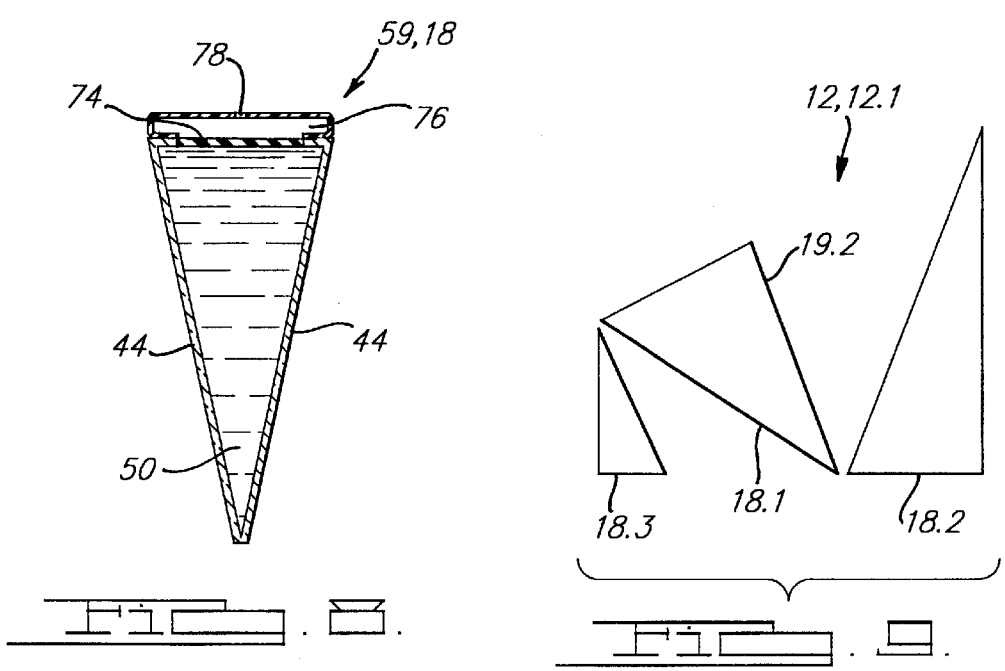

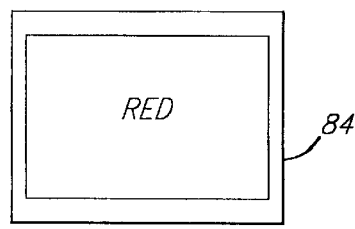
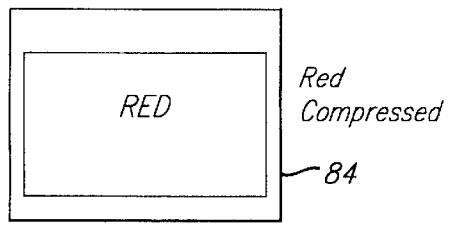
FIG. 11a.    FIG. 11b.
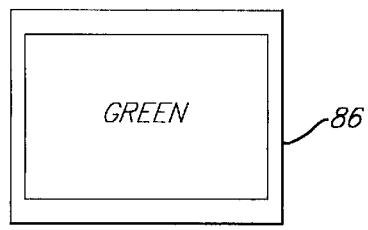
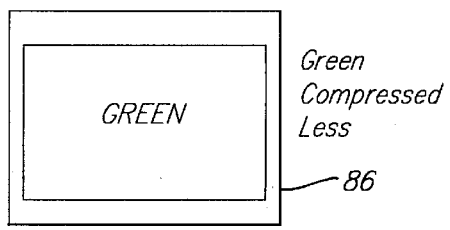
FIG. 12a.    FIG. 12b.
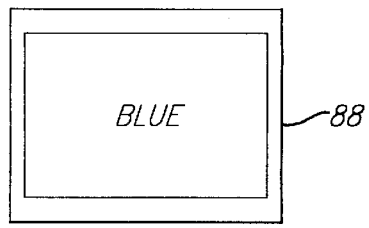
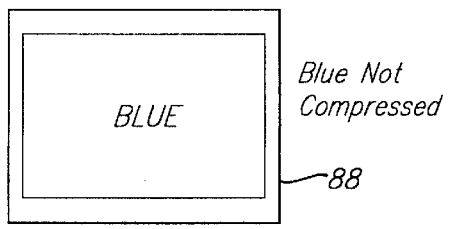
FIG. 13a.    FIG. 13b.
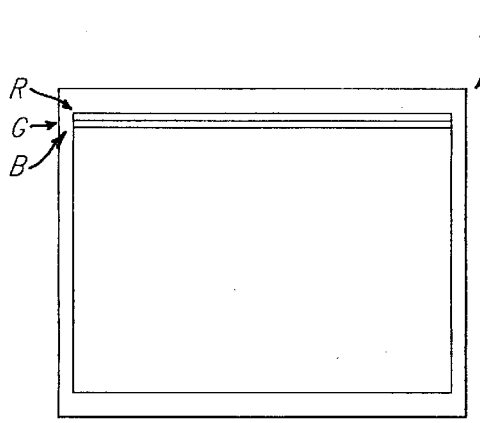
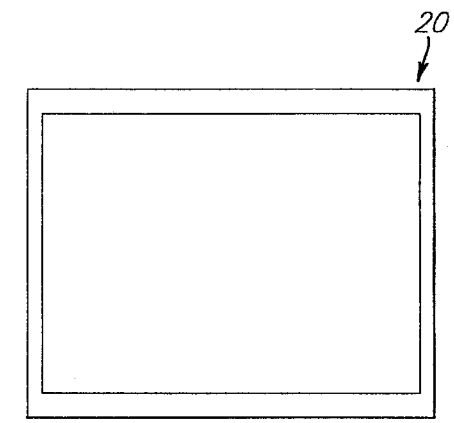
FIG. 14a.    FIG. 14b.

ANAMORPHIC OPTICAL SYSTEM

CROSS-REFERENCE TO RELATED APPLICATIONS

The instant application claims the benefit of prior U.S. Provisional Application Serial No. 60/253,233 filed on Nov. 27, 2000, prior U.S. Provisional Application Serial No. 60/269,114 filed on Feb. 15, 2001, and prior U.S. Provisional Application Serial No. 60/298,259 filed on Jun. 12, 2001, all of which are incorporated herein by reference.

BRIEF DESCRIPTION OF THE DRAWINGS

In the accompanying drawings:

FIG. 4a illustrates an isometric view of a variable corrector;

FIG. 4b illustrates an isometric view of a variable corrector together with an associated adjusting mechanism;

FIG. 5 illustrates a cross-section of a variable cylindrical corrector;

FIG. 6 illustrates a clamp mechanism that can be used in accordance with the embodiments of FIGS. 5 and 7;

FIG. 7 illustrates an embodiment of an anamorphic optical system wherein corrector optics are incorporated in the prisms;

FIG. 8 illustrates an embodiment of a prism at least partially filled with optical fluid, that compensates for variations in pressure or temperature;

FIG. 9 illustrates an embodiment of an anamorphic optical subsystem comprising three prisms;

FIGS. 11a, 12a and 13a illustrate red, blue and green image components without compensation for chromatic aberration;

FIGS. 11b, 12b and 13b illustrate red, blue and green image components with compensation for chromatic aberration;

FIG. 14a illustrates a resulting image from the image components shown in FIGS. 11a, 12a and 13a;

FIG. 14b illustrates a resulting image from the image components shown in FIGS. 11b, 12b and 13b; and FIG. 15 illustrates a second embodiment of a projection imaging system adapted to compensate for chromatic aberration by an anamorphic optical subsystem.

DESCRIPTION OF EMBODIMENTS(S)

An anamorphic optical system provides for different magnifications in different orthogonal directions normal to an optic axis. Anamorphic lenses are most commonly used in the film industry to either compress a wide-field image into a more square frame during filming or to decompress the developed film frame upon projection. Recently the home theater industry has similarly started to use anamorphic lenses to reformat the more square, 4:3 aspect ratio of the common front-projected image into a 16:9 aspect ratio to take advantage of anamorphically compressed DVD movies. By using all the pixels of the 4:3 projector to show a 16:9 image, the image is both brighter and higher resolution than that provided by the conventional letter box format where pixels at the top and bottom of the image are unused.

A first known anamorphic optical system combines spherical and cylindrical lenses to preferentially magnify a beam or image in one direction. A second known anamorphic optical system uses a pair of prisms to provide this magnification while minimizing the amount of necessary deviation to the light path. These known systems, particularly the latter, exhibit anamorphic aberrations that are compounded if the focal length of the incident light varies, as may occur in home theater projection applications. A third known system using off-axis mirrors generally exhibits fewer aberrations, but generally requires relatively large mirrors which increase the size of the resulting system. These known anamorphic optical system are each an example of what is referred to hereinbelow as an anamorphic optical subsystem.

Anamorphic optical systems are known to operate best in an afocal arrangement. There is sufficient prior art describing the use of collimation optics before and/or after the anamorphic optical system to provide this condition. This collimation condition is approximated in some applications such as home theater environments since the projected image is substantially distant from the projection lens and the aperture of the projection lens is very small relative to this distance. However, even slight deviations from ideal collimation will create astigmatic focus aberrations in the image.

Figure 1:
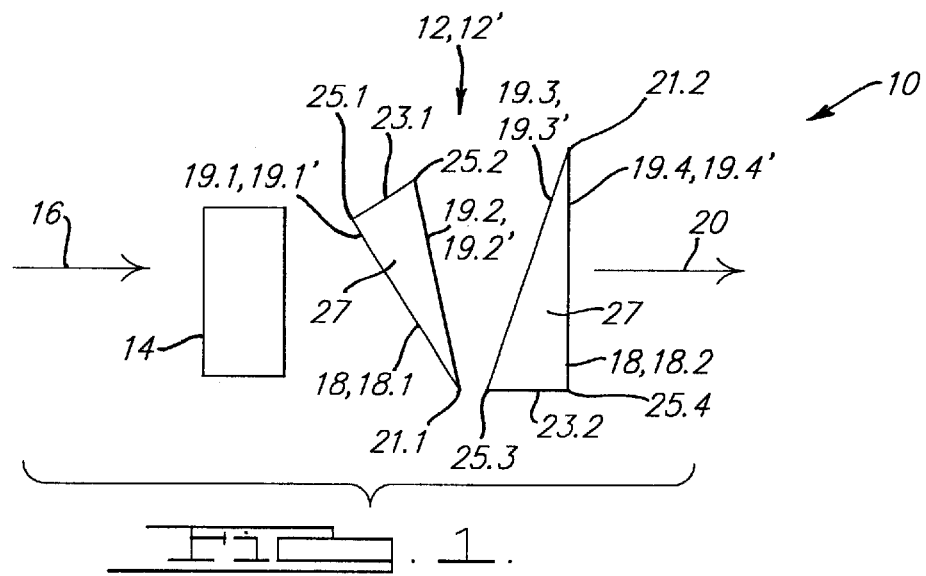
FIG. 1 illustrates an anamorphic optical system incorporating corrector optics and a pair of prisms.

Referring to FIG. 1, an anamorphic optical system 10 comprises an anamorphic optical subsystem 12 in series with corrector optics 14. For example, an anamorphic optical subsystem 12 may comprise a prismatic anamorphic optical subsystem 12' comprising at least one prism. As known by one of ordinary skill in the art, depending upon its orientation relative to a beam of incident light 16, a prism 18, can either expand or compress the size of a beam or image. Whereas a single prism 18 provides for both anamorphic magnification and redirection of the beam of incident light 16, a pair of prisms 18 may be adapted to provide for anamorphic magnification without redirecting the beam of incident light 16.

More particularly, the pair of prisms 18 comprise a first prism 18.1 and a second prism 18.2. The first prism 18.1 comprises first 19.1 and second 19.2 surfaces, wherein a first plane 19.1' underlying the first surface 19.1 intersects with a second plane 19.2' underlying the second surface 19.2 at a first apex 21.1. The first prism 18.1 further comprises a first base boundary 23.1, wherein the first surface 19.1 comprises a first edge 25.1 that is distal to the first apex 21.1, the second surface 19.2 comprises a second edge 25.2 that is distal to the first apex 21.1, and the first base boundary 23.1 extends between the first edge 25.1 and the second edge 25.2. The first prism 18.1 further comprises at least one optical medium 27 between the first 19.1 and second 19.2 surfaces.

Similarly, the second prism 18.2 comprises third 19.3 and fourth 19.4 surfaces, wherein a third plane 19.3' underlying the third surface 19.3 intersects with a fourth plane 19.4' underlying the fourth surface 19.4 at a second apex 21.2. The second prism 18.2 further comprises a second base boundary 23.2, wherein the third surface 19.3 comprises a third edge 25.3 that is distal to the second apex 21.2, the fourth surface 19.4 comprises a fourth edge 25.4 that is distal to the second apex 21.2, and the second base boundary 23.2 extends between the third edge 25.3 and the fourth edge 25.4. The second prism 18.2 further comprises at least one optical medium 27 between the third 19.3 and fourth 19.4 surfaces.

The pair of prisms 18.1, 18.2 are adapted to provide for anamorphic magnification by arranging the first 18.1 and second 18.2 prisms in a complementary relationship, so that the first apex 21.1 is aligned with the second base boundary 23.2 and the first base boundary 23.1 is aligned with the second apex 21.2. The first 18.1 and second 18.2 prism in combination generate at least one aberration in the beam of light passing therethrough.

The corrector optics 14 are adapted to aberrate the incident light 16 in a manner that at least partially compensates for at least one aberration caused by anamorphic optical subsystem 12, so as to reduce the amount of aberration in the beam of exit light 20 caused by the anamorphic optical system 10. For example, with the incident light 16 entering the anamorphic optical subsystem 12 after passing through the corrector optics 14, the corrector optics 14 acts to pre-aberrate the light entering the anamorphic optical subsystem 12 so as to reduce the resulting net aberrations in the exit light 20. Generally, the corrector optics 14 may be placed anywhere in the optical path, either ahead of or after the anamorphic optical subsystem 12. However, if the incident light 16 exhibits angular field properties rather than being unidirectional, the arrangement illustrated in FIG. 1 would generally require smaller corrector optics 14 than if the corrector optics 14 were located after the anamorphic optical subsystem 12 where the light exiting therefrom could be significantly diverged.

The anamorphic optical subsystem 12 is designed in accordance with known principles to generally produce a desired anamorphic magnification of the incident light 16. Whereas the corrector optics 14 may be adapted to other types of anamorphic optical subsystems 12, a prismatic anamorphic optical subsystem 12' is advantageous in not significantly changing the direction of incident light 16, and in being relatively simple to manufacture.

The corrector optics 14 may be constructed in accordance with any of a variety of different embodiments, as described hereinbelow. The selection of a particular embodiment is dependent upon the desired characteristics of the anamorphic optical system 10. The corrector optics 14 is also adapted to provide a slight focus change (optical power) that is different in the direction of anamorphic magnification than it is in an orthogonal direction, so as to compensate for an asymmetric, somewhat astigmatic focus shift that is different in these two directions, which is generally characteristic of the aberrations of anamorphic optical subsystems 12. By effectively applying a cylindrical lens, or a functionally similar element, as a corrective element in combination with a slight spherical (uniform) power to the incident light 16 (such as through the focusing of a projection lens), this residual aberration can be substantially corrected so that the image comes into focus in both directions on the same image surface.

Figure 2:
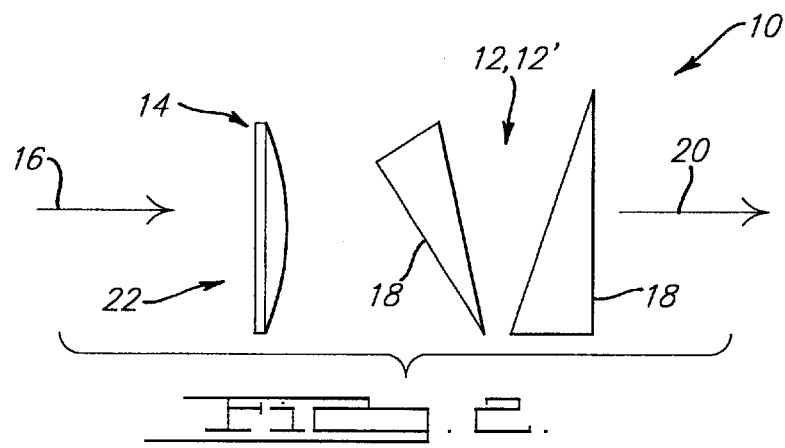
FIG. 2 illustrates an embodiment of an anamorphic optical system incorporating a cylindrical corrector.

Referring to FIG. 2, the corrector optics 14 comprises a cylindrical corrector 22, the curvature of which is exaggerated in FIG. 2 for purposes of illustration. For example, an anamorphic compression of 25% of an image at a distance of ten (10) meters from a projection lens required a plano-convex cylindrical corrector 22 having a twelve (12) meter radius to bring the image into focus. A cylindrical lens in the orthogonal direction would require a concave surface. The anamorphic optical system 10 with a cylindrical corrector 22—and also generally for other corrector optics 14 arrangements—benefits from a specific focal length of the incident light 16 to provide a given focal length of the exit light 20 with best focus. Such parameters are readily generated through the use of conventional optical design algorithms known to those of ordinary skill in the art. The curvature of the cylindrical corrector 22 depends upon the nature of the associated aberration to be corrected. Moreover, the associated radius of curvature is not necessarily constant, which is generally true herein when any reference is made to a cylindrical curvature or to a cylindrical lens.

Figure 3:
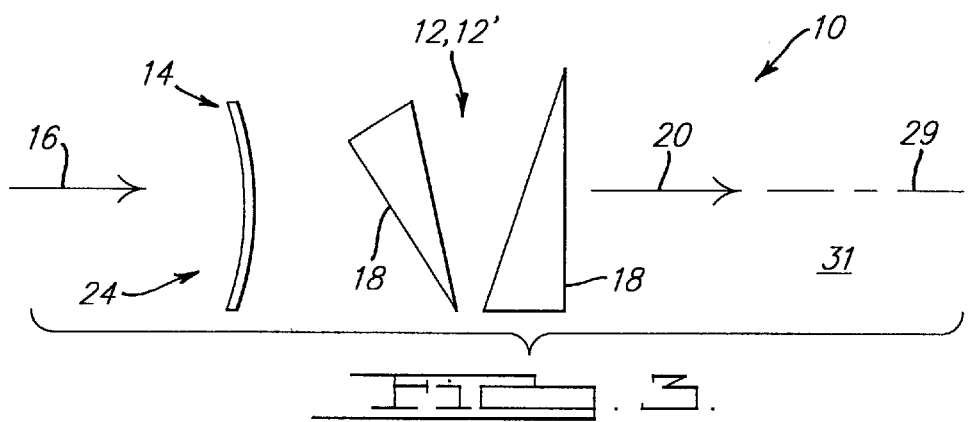
FIG. 3 illustrates an embodiment of an anamorphic optical system incorporating a cylindrical window corrector.

Referring to FIG. 3, for systems where it is desirable to have an adjustable focal length of the exit light 20 it is also preferable to alter the focal length of the corrector optics 14 in combination with an alteration of the focal length of the incident light 16. The generally long distance of the corrector focal length can be exploited by introducing a thin optical window, for example, made of plastic, initially oriented as shown in FIG. 3, and bent into a radius by forces applied at the edges so as to form a cylindrical window corrector 24. When a material is bent, the two surfaces do not maintain a perfect parallel relationship and the respective radii of the surfaces therefore become slightly different, so as to induce a slight optical power. For example, a 0.5 millimeter acrylic sheet was sufficient to correct the aberrations present in an image that was anamorphically compressed by 25% using a prismatic anamorphic optical subsystem 12' comprising a prism pair, with a projector-to-screen distance of approximately three (3) meters. Changing the distance to the screen (the focal length of exit light 20), can be readily accommodated by altering the amount of curvature on the window in combination with a minor focus adjustment of the projector lens. The bending is preferably performed in the axis orthogonal to the compression axis (rotated ninety degrees around the optic axis 29 from the illustrated orientation), which suggests that the bent thin window becomes relatively thinner in the center than at its edges with respect to the incident light 16, resulting in a negative power that is prescribed in the orthogonal direction as per the optional plano-concave (negative) corrector of the embodiment illustrated in FIG. 1. Accordingly, the curvature of the cylindrical window corrector 24 is substantially transverse to a plane 31 of anamorphic magnification of the prismatic anamorphic optical subsystem 12'.

Referring to FIGS. 4a and 4b, the corrector optics 14 may comprise a variable corrector 26 comprising first 28 and second 30 anamorphic elements, each comprising any single subelement or group of subelements exhibiting anamorphic power. Each first 28 and second 30 anamorphic element has an associated direction 32.1, 32.2 of anamorphic power, and the first 28 and second 30 anamorphic elements are mounted in an assembly with a mechanism by which the first 28 and second 30 anamorphic elements can be rotated relative to one another, thereby rotating the corresponding directions 32.1, 32.2 of anamorphic power relative to one another. For example, as illustrated in FIG. 4b, the first 28 and second 30 anamorphic elements can be mounted in respective wheel structures 34.1, 34.2 of a counter-rotating mechanism 35 substantially aligned with and parallel to one another, and which are adapted to be rotated with respect to one another, wherein the respective directions 32.1, 32.2 of anamorphic power are each oriented parallel to a common plane. For example, facing surfaces 36.1, 36.2 of the wheel structures 34.1, 34.2 may incorporate teeth, for example gear teeth, particularly conical gear teeth, or a friction surface that engage with mating teeth or a mating surface operatively connected to an adjusting knob 38, whereby the variable corrector 26 is adjusted by rotating the adjusting knob 38, which symmetrically counter-rotates the associated wheel structures 34.1, 34.2, thereby counter-rotating the direction 32.1, 32.2 of anamorphic power of the respective first 28 and second 30 anamorphic elements. The relative amount of anamorphic magnification in orthogonal directions is responsive to the counter-rotation angle a of the first 28 and second 30 anamorphic elements. The variable corrector 26 provides for correcting prism errors over a wide range of focal lengths of the incident light 16. Moreover, the first 28 and second 30 anamorphic elements may advantageously comprise conventional, stress-free elements such as cylindrical lenses. The cylindrical power of the first 28 and second 30 anamorphic elements can be determined by optimizing the optical design over the desired range of desired exit light 20 focal lengths in combination with a variable focal change of the incident light 16.

Referring to FIG. 5, the corrector optics 14 may comprise a variable cylindrical corrector 40 comprising a cavity 42 between two optical surfaces 44, wherein the optical surfaces 44 are deformed, for example, by applying a clamping force 46 along opposing edges 48 of the optical surfaces 44, wherein the amount of resulting optical power of the variable cylindrical corrector 22 is responsive to the amount of clamping force 46. The cavity 76 is at least partially filled with an optical fluid 50, for example, an optical liquid such as mineral oil, that in one embodiment reacts against the optical surfaces 44 responsive to the clamping forces 46 thereby causing at least one optical surface 44 to deform into a cylindrical shape. Different optical surfaces 44 having respectively different thicknesses deform by different amounts thereby providing for different amounts of relative optical power, so that with one surface relatively thick, and the other relatively thin, a substantially plano-convex lens is formed responsive to the clamping or pressurization. For example, first 52 and second 54 glass substrates may be bonded to one another along a perimeter 56, for example, by a layer of flexible silicone along the perimeter 56. In another embodiment, the deformation of the first glass substrate 52 may be assisted or controlled by fulcrums 57 between the first 52 and second 54 glass substrates at each end thereof.

Referring to FIG. 6, the clamping force 46 may be generated by at least one clamp mechanism 59 operatively coupled to either both opposing edges 48, or to one of the opposing edges 48 provided that the other opposing edge 48 is retained by some other means, e.g. a frame, clip or bond. For example, the clamp mechanism 59 illustrated in FIG. 6 comprises a push bar 61 that distributes the clamping force 46 across the opposing edge 48 being clamped. The clamp mechanism 57 further comprises a cam 63 that engages with a follower surface 65 in or on the push bar 59, and that is rotated by a knob 67. As the knob 67 is rotated, the cam 63 engages the follower surface 65, which moves the push bar 61 against the opposing edge 48 of the first glass substrate 52 which generates an adjustable clamping force 46 thereon which is reacted by a frame (not illustrated) operatively connected to the cam 63 and to the second glass substrate 54. Accordingly, the curvature of the first glass substrate 52 is responsive to the clamping force 46, which in turn is responsive to the position of the cam 63.

Alternately, the optical surfaces 44 may be deformed by either pressurizing the optical fluid 50 in the cavity 42 to form at least one convex surface, or by evacuating the cavity 42 to form at least one concave surface. If the first 52 and second 54 glass substrates are substantially longer than they are wide, then responsive to pressurization, the deformation will be substantially greater across the width 58 than across the length of the deforming substrate. The variable cylindrical corrector 22 may be further provided with additional structure to preferentially stiffen the substrates along one direction so as to prevent bending in that direction.

Referring to FIG. 7, a variable cylindrical corrector 40.1 may be incorporated into at least one surface of a prism 59, wherein the corrector optics 14 are incorporated in the associated prismatic anamorphic optical subsystem 12' of the associated anamorphic optical system 10. Rather than using a conventional solid prism, at least one prism 59 of an anamorphic optical system 10 may, for example, comprise a pair of flat windows 60, for example, of glass, bonded to a prismatic shell or frame 62 and at least partially filled with an optical liquid 64. At least one surface 66, particularly the edge thereof, of such a prism 59 may include a flexible seal 68 and a clamp mechanism 59 for applying an edge pressure so as to deform the surface 66, thereby providing cylindrical optical power. This obviates the need for separate corrector optics 14. Flat windows 60 that are intended to remain flat may, for example, be bonded to the prismatic shell or frame 62 with a relatively rigid adhesive, for example, with epoxy. The resulting relatively thick prisms 59, 18 can be readily adapted with ports 72 for at least partially filling the prisms 59 with optical liquid 64, so as to provide the variable correction feature and for reducing the cost of the associated anamorphic optical subsystem 12. Moreover, because the liquid volume of the prism 59 incorporating a variable cylindrical corrector 40.1 is substantially greater than that of a relatively thin, separate variable cylindrical corrector 40, there is less of a restriction to the local flow of fluid therein as the edge pressure is applied to the associated optical surfaces 44, resulting in a faster settling response of the system to a pressure setting. The surfaces 66 of the prismatic anamorphic optical subsystem 12" that preferably include variable power may be determined through optimization of the anamorphic optical system 10 through known optical design algorithms.

The at least one prism 59 at least partially filled with optical fluid 50, described hereinabove, provides a cost-effective way of fabricating relatively high quality, relatively large prisms. Relatively high quality optical glass sheets are readily available at low cost, even with antireflection coatings pre-applied to the external surfaces. However, changes in atmospheric pressure and temperature can cause a differential pressure between the inside and outside of the prism that, under extreme conditions, can stress the structure thereof and, even in minor cases, can warp the optical surfaces 44 causing aberrations in the associated image.

One way this problem can be mitigated is by partially filling the prism 59 with optical fluid 50, thereby leaving a volume—e.g. comprising air or some other gas, e.g. nitrogen or an inert gas—within the prism 59 so as to provide for the change in volume of the optical fluid 50 without causing excessive variations in pressure that could otherwise adversely distort at least one optical surface 44 of the prism 59. Alternately, the prism 59 could incorporate a vessel, or a material, therein adapted to be substantially more compliant than the optical surfaces 44 of the prism 59 so as to provide similar compensation.

Alternately, referring to FIG. 8, this problem can be mitigated by incorporating a flexible membrane 74, e.g. neoprene or VITON®, in one end of the prism 59, e.g. part of a wall of the prism housing. The flexible membrane 74 is impermeable to the optical fluid 50, and is substantially more flexible than the optical surfaces 44, e.g. glass plates, yet not so flexible as to sag under the hydrostatic pressure of the fluid if the prism 59 is inverted. The prism 59 may optionally further incorporate a relatively small cavity 76 proximate to a side of the flexible membrane 74 opposite to the optical fluid 50, that is vented to atmosphere through a relatively small orifice 78 that is sufficiently small so as to dampen the effects of relatively rapid changes to the pressure of the optical fluid 50, e.g. as caused by forces on the prism 59, e.g. from shipping and handling, but sufficiently large to enable the flexible membrane 74 to compensate for relatively long term changes in pressure or temperature. It should be understood that the flexible membrane 74—with or without the cavity 76 and orifice 78—could alternately be incorporated in a plug that seals the associated port 72 through which the prism 59 is at least partially filled with optical fluid 50. For example, the plug could be adapted to thread into the prism 59, and could incorporate an external flange that would seal against a surface of the prism 59 with an O-ring.

Whereas the anamorphic optical system 10 of FIG. 7 is illustrated incorporating a clamp mechanism 59 for deforming at least one surface 66 of at least one prism 59, it should be understood that the at least one surface 66 could alternately be constructed with a single, fixed cylindrical face, and thereby provide satisfactory results for at least some applications. For example, in the common home theater projection scenario, for a vertical compression (anamorphic magnification) of approximately 25%, the cylindrical curvature of the second surface 19.2 of the first prism 18.1 was minus 6500 millimeters (concave with respect to the fluid, externally convex, as generally shown in FIG. 5) for a projector to screen distance of 4.5 meters. In practice, this curvature provides sufficient quality for a range of projector to screen distances between approximately 3 and 7 meters so as to substantially obviate the need for variable focusing.

Accordingly a fixed cylindrical face was created by machining the appropriate curvature into the end plates 79 of the prismatic shell or frame 62 and then bonding—e.g. with an epoxy—and clamping the associated originally flat window 60 to the curved surface. In this case, it is beneficial for the stiffness of the flat window 60 to be sufficient to maintain the cylindrical curvature over the entire surface, while also being sufficiently flexible to form the curvature without undergoing fracture or other failure. In the case of a 6500 millimeter radius, a 1.6 millimeter thick flat window 60 of glass sheet provided suitable properties for a prism approximately 150 millimeters across the second surface 19.2.

Moreover, whereas the anamorphic optical system 10 of FIG. 7 is illustrated incorporating prisms 59 at least partially filled with optical fluid 50, it should be understood that one or more prisms 59 could alternately be solid, e.g. constructed of one or more materials, e.g. one material, e.g. optical glass.

Several problems that are typically associated with anamorphic optical systems are barrel-shaped distortion under image compression, and pincushion distortion under expansion, each of which increases with the amount of magnification. The combination of corrector optics 14 with an associated anamorphic optical subsystem 12 provides synergistic benefits. For example, a cylindrical lens system may be used to expand the horizontal direction of an image, creating pincushion distortion. A corrected prismatic assembly may then be used to compress the vertical direction of the image, increasing the overall relative magnification between the horizontal and vertical directions. The two assemblies may be independently or jointly corrected for most optical aberrations. However, the distortions of each assembly, being opposite in sign, are applied against each other to minimize the net result.

The anamorphic optical system 10 described herein can be used in a variety of applications that would benefit from anamorphic magnification with relatively reduced aberrations, for example, including, but not limited to, home theater projection or for transforming a laser beam—for example, as generated by a diode laser—from an elliptical to a circular cross-section.

As described hereinabove, a prism assembly may be used to stretch or compress one dimension of a projected image. However, without further compensation, there can be a residual lateral chromatic aberration in the resulting image. This aberration may be reduced by pre-aberrating the image prior to entering the prism assembly.

Depending on the angles and orientation of the prism 18.1, 18.2, certain characteristics in the resulting image, for example, the linearity of the vertical compression, can be optimized, perhaps as a trade-off with respect to other characteristics. Moreover, referring to FIG. 9, the prismatic anamorphic optical subsystem 12' may be adapted to increase the anamorphic magnification by using three prisms, for example, each filled with an optical fluid as illustrated in FIG. 8. For example, the prismatic anamorphic optical subsystem 12" illustrated in FIG. 7 can be adapted with a third prism 18.3 before the first prism 18.2, wherein the second surface 19.2 of the first prism 18.1 is adapted to incorporate a curved refractive element as described hereinabove.

Figure 10:
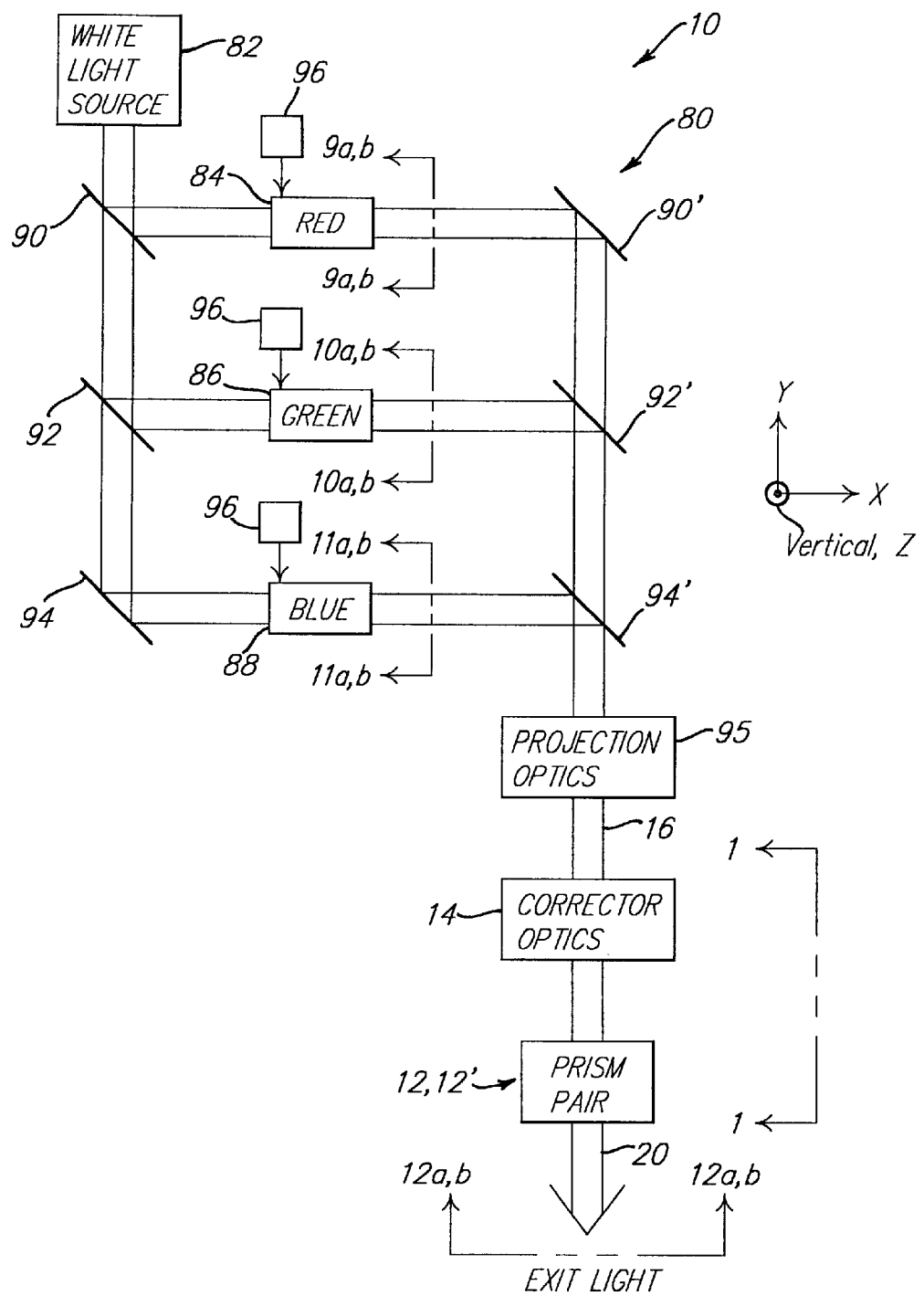
FIG. 10 illustrates a projection imaging system adapted to compensate for chromatic aberration by an anamorphic optical subsystem.

Referring to FIG. 10, in another embodiment of an anamorphic optical system 10 that pre-aberrates the image, a projector 80 having dedicated red, green and blue image component generators is used wherein the size and position of the image of each component generator is modified to produce this pre-aberration. The projector 80 comprises a white light source 82, the light from which is distributed to respective red 84, green 86, and blue 88 image modulators either by respective beam splitters 90, 92 or mirror(s) 94, or by separate illumination of the respective image modulator 84, 86, 88. The particular colored light for each respective image modulator 84, 86, 88 is either filtered before or within the respective image modulator 84, 86, 88. The respective colored light from the respective image modulators 84, 86, 88 is then recombined—for example, with associated mirror(s) 90' and beam splitters 92, 94'—and projected by projection optics 95, e.g. a projection lens, so as to form a beam of incident light 16 upon the corrector optics 14 and anamorphic optical subsystem 12 as described hereinabove. It should be understood that it is beneficial for the respective beam paths from each respective image modulator 84, 86, 88 to the projection optics 95 to be generally equidistant, notwithstanding that this condition is not illustrated literally in FIG. 8 as drawn.

In operation, for the anamorphic optical subsystem 12 comprising a prismatic anamorphic optical subsystem 12' oriented to as to introduce aberrations along the vertical axis (Z), each component image is vertically scaled and then vertically shifted by the respective one or more image modulators 84, 86, 88 to compensate for the anamorphic lens lateral chromatic aberration. The vertical scaling (compression or expansion) may be performed either with a dedicated anamorphic lens at the component image modulator 84, 86, 88, or preferably, by prescaling the electronic image using a readily available electronic scaling device 96. The shifting of the respective image components of the respective colors may also be performed by electronically shifting the image location vertically on the modulator by simply adjusting the vertical position of the modulator.

Figure 13:
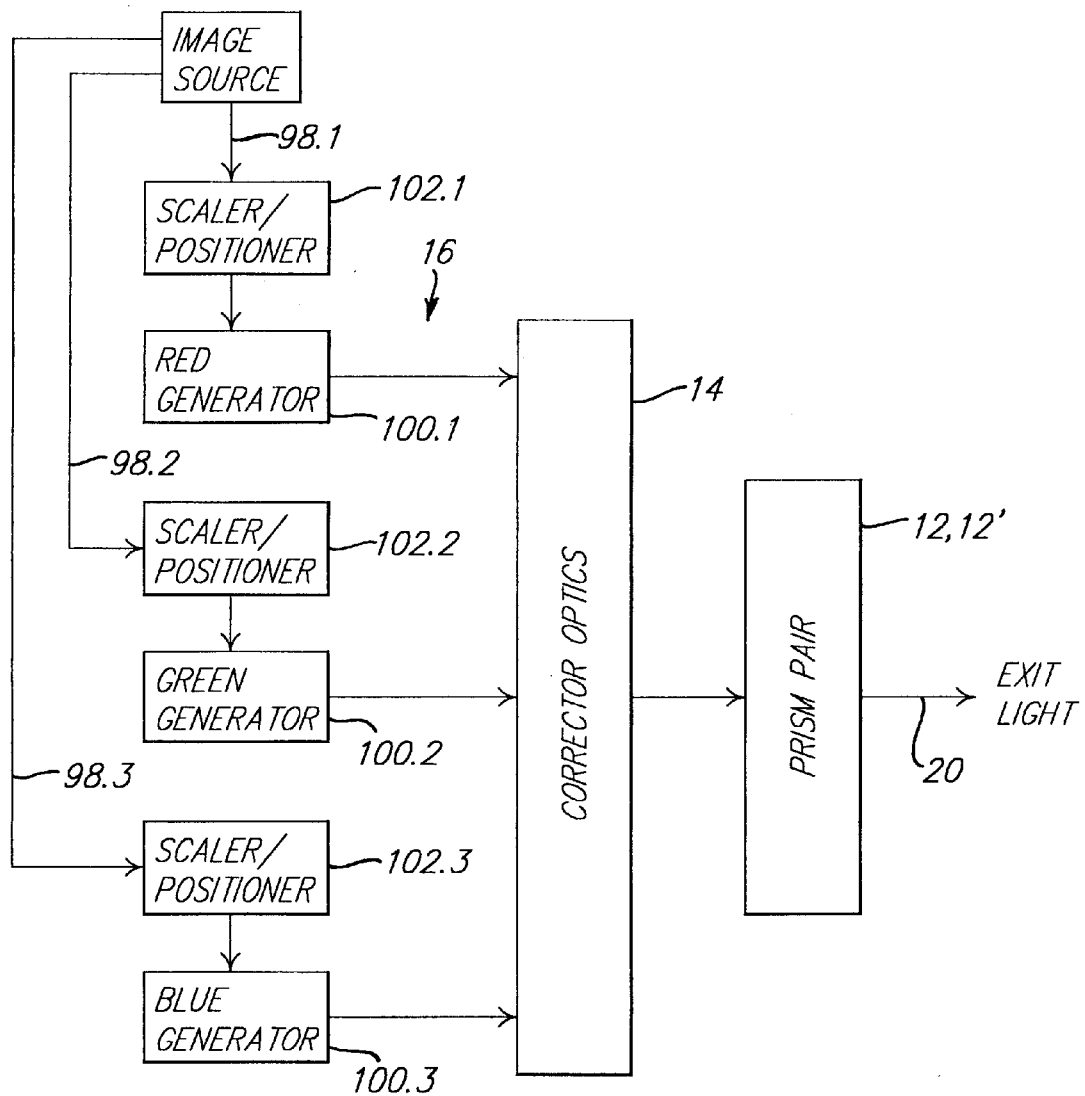

If the respective image components of the respective colors are not shifted and scaled—as is illustrated respectively in FIGS. 11a, 12a and 13a—then the corresponding image components in the composite image are not properly aligned with one another, as is illustrated in FIG. 14a. The respective image components in the composite image—illustrated in FIG. 14b—are properly aligned as a result of the above described scaling applied to the individual image components—illustrated in FIGS. 11b, 12b and 13b, wherein the blue image is not compressed, the red image is vertically compressed, and the green image is vertically compressed less than the red image, so that the integrated image in FIG. 14b does not exhibit evidence of chromatic aberration.

Referring to FIG. 15, in a second embodiment, an electronic signal 98.1, 98.2, 98.3 to each image component generator 100.1, 100.2, 100.3 is modified by a respective scaler/positioner 102.1, 102.2, 102.3 to achieve the proper result by altering the size and position of each component image on its respective image component generator 100.1, 100.2, 100.3. The scaling and shifting of the respective image components is in accordance with the description hereinabove. If a single modulator is used for all colors, then the component images for each color are preferably compressed and shifted electronically. As an alternative to vertical scaling symmetrically about the optical axis and shifting, each image may be scaled so that the compression is greater in one vertical location than another, thereby effectively compressing the component image toward the vertical position of least chromatic aberration.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

I claim:

1. An anamorphic optical system, comprising:
   a. a first prism, wherein said first prism comprises:
      i. a first surface;
      ii. a second surface, wherein a first plane underlying said first surface intersects with a second plane underlying said second surface, and said first and second planes intersect at a first apex;
      iii. a first base boundary, wherein said first surface comprises a first edge that is distal to said first apex, said second surface comprises a second edge that is distal to said first apex, and said first base boundary extends between said first edge and said second edge; and
      iv. at least one optical medium between said first surface and said second surface;
   b. a second prism, wherein said second prism comprises:
      i. a third surface;
      ii. a fourth surface, wherein a third plane underlying said third surface intersects with a fourth plane underlying said fourth surface, and said third and fourth planes intersect at a second apex;
      iii. a second base boundary, wherein said third surface comprises a third edge that is distal to said second apex, said fourth surface comprises a fourth edge that is distal to said second apex, and said second base boundary extends between said third edge and said fourth edge; and
      iv. at least one optical medium between said third surface and said fourth surface, wherein said first and second prisms are arranged in a complementary relationship, so that said first apex is aligned with said second base boundary and said first base boundary is aligned with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light; and
   c. at least one curved refractive element operatively associated with said first and second prism, wherein said at least one curved refractive element exhibits asymmetric optical power relative to a direction of anamorphic power and to an orthogonal direction thereto, and said at least one curved refractive element generates a second aberration in said incident beam of light that at least partially compensates for at least one of said at least one first aberration when said incident beam of light passes through said first prism, said second prism and said curved refractive element.

2. An anamorphic optical system comprising:
   a. a first prism, wherein said first prism comprises:
      i. a first surface;
      ii. a second surface, wherein a first plane underlying said first surface intersects with a second plane underlying said second surface, and said first and second planes intersect at a first apex;
      iii. a first base boundary, wherein said first surface comprises a first edge that is distal to said first apex, said second surface comprising second edge that is distal to said first apex, and said first base boundary extends between said first edge and said second edge; and
      iv. at least one optical medium between said first surface and said second surface;
   b. a second prism, wherein said second prism comprises:
      i. a third surface;
      ii. a fourth surface, wherein a third plane underlying said third surface intersects with a fourth plane underlying said fourth surface, and said third and fourth planes intersect at a second apex;
      iii. a second base boundary, wherein said third surface comprises a third edge that is distal to said second apex, said fourth surface comprises a fourth edge that is distal to said second apex, and said second base boundary extends between said third edge and said fourth edge; and
      iv. at least one optical medium between said third surface and said fourth surface, wherein said first and second prisms are arranged in a complementary relationship, so that said first apex is aligned with said second base boundary and said first base boundary is aligned with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light; and
   c. at least one curved refractive element operatively associated with said first and second prism, wherein said at least one curved refractive element generates a second aberration in said incident beam of light that at least partially compensates for at least one of said at least one first aberration when said incident beam of light passes through said first prism, said second prism and said curved refractive element, wherein said at least one curved refractive element comprises a first cylindrical lens.

3. An anamorphic optical system as recited in claim 1, wherein said at least one curved refractive element comprises a curved substrate of optical material.

4. An anamorphic optical system as recited in claim 3, wherein said curved substrate has a curvature that is substantially transverse to a plane of anamorphic magnification of said first and second prisms.

5. An anamorphic optical system as recited in claim 2, wherein said at least one curved refractive element further comprises:
   a. a second cylindrical lens, wherein said first cylindrical lens has a center of curvature comprising a first line in a first plane, said second cylindrical lens has a center of curvature comprising a second line in a second plane, and said first plane and said second plane are substantially parallel to one another; and
   b. a counter-rotating mechanism, wherein said first and second cylindrical lenses are operatively connected to said counter-rotating mechanism, said counter-rotating mechanism is adapted to rotate said first cylindrical lens by a first angle in a first direction in a plane parallel to said first plane and said counter-rotating mechanism is adapted to rotate said second cylindrical lens by second angle in a second direction in a plane parallel to said second plane, said first and second angles are substantially equal to one another, and said first and second directions are opposite to one another.

6. An anamorphic optical system as recited in claim 5, wherein said first and second cylindrical lenses are substantially the same.

7. An anamorphic optical system as recited in claim 2, wherein said first cylindrical lens comprises:
   a. a first substrate of optical material comprising first and second opposing edges, and third and fourth opposing edges;
   b. a second substrate of optical material comprising first and second opposing edges, and third and fourth opposing edges;
   c. a first fulcrum between said first and second substrates along said third edges of said first and second substrates;
   d. a second fulcrum between said first and second substrates along said fourth edges of said first and second substrates;
   e. a flexible seal between and along said first edges, said second edges, said third edges and said fourth edges;
   f. an optical fluid between said first and second substrates within said flexible seal; and
   g. at least one clamp mechanism for clamping at least one pair of said first edges and said second edges towards one another so as to deform at least one of said first substrate and said second substrate about said first and second fulcrum so as to define a curvature of said first cylindrical lens.

8. An anamorphic optical system as recited in claim 7, wherein said at least one clamp mechanism provides for adjusting said curvature.

9. An anamorphic optical system as recited in claim 2, wherein said first cylindrical lens comprises:
   a. a first substrate of optical material comprising first and second opposing edges, and third and fourth opposing edges;
   b. a second substrate of optical material comprising first and second opposing edges, and third and fourth opposing edges;
   c. a first spacer portion between said third edges of said first and second substrates; and
   d. a second spacer portion between said fourth edges of said first and second substrates, wherein said first and second spacers define a contour of said first cylindrical lens, and said first and second substrates are deformed and bonded to said first and second spacers.

10. An anamorphic optical system as recited in claim 9, further comprising:
   a. at least one seal between said first edges of said first and second substrates;
   b. at least one seal between said second edges of said first and second substrates; and
   c. an optical fluid between said first and second substrates.

11. An anamorphic optical system as recited in claim 1, wherein said at least one curved refractive element comprises at least one surface selected from said first surface, said second surface, said third surface and said fourth surface of at least one of said first and second prism, and said at least one surface has a corresponding curvature.

12. An anamorphic optical system as recited in claim 11, wherein said corresponding curvature is in a plane of anamorphic magnification of said first and second prisms.

13. An anamorphic optical system comprising:
   a. a first prism, wherein said first prism comprises:
      i. a first surface;
      ii. a second surface, wherein a first plane underlying said first surface intersects with a second plane underlying said second surface, and said first and second planes intersect at a first apex;
      iii. a first base boundary, wherein said first surface comprises a first edge that is distal to said first apex, said second surface comprises a second edge that is distal to said first apex, and said first base boundary extends between said first edge and said second edge; and
      iv. at least one optical medium between said first surface and said second surface;
   b. a second prism, wherein said second prism comprises:
      i. a third surface;
      ii. a fourth surface, wherein a third plane underlying said third surface intersects with a fourth plane underlying said fourth surface, and said third and fourth planes intersect at a second apex;
      iii. a second base boundry, wherein said third surface comprises a third edge that is distal to said second apex, said fourth surface comprises a fourth edge that is distal to said second apex, and said second base boundary extends between said third edge and said fourth edge; and
      iv. at least one optical medium between said third surface and said fourth surface, wherein said first and second prisms are arranged in a complementary relationship, so that said first apex is aligned with said second base boundary and said first base boundary is aimed with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light; and c. at least one curved refractive element operatively associated with said first and second prism, wherein said at least one curved refractive element generates a second aberration in said incident beam of light that at least partially compensates for at least one of said at least one first aberration when said incident beam of light passes through said first prism, said second prism and said curved refractive element, said at least one curved refractive element comprises at least one surface selected from said first surface, said second surface, said third surface and said fourth surface of at least one of said first and second prism, said at least one surface has a corresponding curvature, said corresponding curvature is in a plane of anamorphic magnification of said first and second prisms, said first or second prism corresponding to said at least one surface comprises corresponding first and second end plates; said at least one surface is defined by a corresponding substrate of optical material; said corresponding curvature of said at least one surface is defined by said corresponding first and second end plates; said corresponding first and second end plates are shaped so as to define said corresponding curvature; said corresponding substrate of optical material is deformed and bonded to said first and second end plates, and said at least one optical medium of said first or second prism corresponding to said at least one surface comprises an optical fluid.

14. An anamorphic optical system comprising:
a. a first prism, wherein said first prism comprises:
   i. a first surface;
   ii. a second surface, wherein a first plane underlying said first surface intersects with a second plane underlying said second surface, and said first and second planes intersect at a first apex;
   iii. a first base boundary, wherein said first surface comprises a first edge that is distal to said first apex, said second surface comprises a second edge that is distal to said first apex, and said first base boundary extends between said first edge and said second edge; and
   iv. at least one optical medium between said first surface and said second surface;
b. a second prism, wherein said second prism comprises:
   i. a third surface;
   ii. a fourth surface, wherein a third plane underlying said third surface intersects with a fourth plane underlying said fourth surface, and said third and fourth planes intersect at a second apex;
   iii. a second base boundary, wherein said third surface comprises a third edge that is distal to said second apex, said fourth surface comprises a fourth edge that is distal to said second apex, and said second base boundary extends between said third edge and said fourth edge; and
   iv. at least one optical medium between said third surface and said fourth surface, wherein said first and second prisms are arranged in a complementary relationship, so that said first apex is aligned with said second base boundary and said first base boundary is aligned with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light; and c. at least one curved refractive element operatively associated with said first and second prism, wherein said at least one curved refractive element generates a second aberration in said incident beam of light that at least partially compensates for at least one of said at least one first aberration when said incident beam of light passes through said first prism, said second prism and said curved refractive element, said at least one curved refractive element comprises at least one surface selected from said first surface, said second surface, said third surface and said fourth surface of at least one of said first and second prism, said at least one surface has a corresponding curvature, said corresponding curvature is in a plane of anamorphic magnification of said first and second prisms, said first or second prism corresponding to said at least one surface comprises corresponding first and second end plates; said at least one surface is defined by a corresponding substrate of optical material; and said at least one optical medium of said first or second prism corresponding to said at least one surface comprises an optical fluid, and said first or second prism corresponding to said at least one surface comprises:
   i. a first fulcrum between said corresponding first end plate and said corresponding substrate of optical material;
   ii. a second fulcrum between said corresponding second end plate and said corresponding substrate of optical material; and
   iii. at least one clamp mechanism for clamping at least one edge of said at least one surface so as to deform said corresponding substrate of optical material about said first and second fulcrum so as to define said curvature, wherein said at least one clamp mechanism provides for adjusting said corresponding curvature.

15. An anamorphic optical system as recited in claim 1, wherein at least one of said first and second prism further comprises:
a. a sealed periphery between said surfaces of said at least one of said first and second prisms establishing a confinement between said surfaces; and
b. an optical fluid within said confinement.

16. An anamorphic optical system as recited in claim 15, wherein said optical fluid comprises mineral oil.

17. An anamorphic optical system, comprising:
a. a first prism, wherein said first prism comprises:
   i. a first surface;
   ii. a second surface, wherein a first plane underlying said first surface intersects with a second plane underlying said second surface, and said first and second planes intersect at a first apex;
   iii. a first base boundary, wherein said first surface comprises a first edge that is distal to said first apex, said second surface comprises a second edge that is distal to said first apex, and said first base boundary extends between said first edge and said second edge; and
   iv. at least one optical medium between said first surface and said second surface;

b. a second prism, wherein said second prism comprises:
  i. a third surface;
  ii. a fourth surface, wherein a third plane underlying said third surface intersects with a fourth plane underlying said fourth surface, and said third and fourth planes intersect at a second apex;
  iii. a second base boundary, wherein said third surface comprises a third edge that is distal to said second apex, said fourth surface comprises a fourth edge that is distal to said second apex, and said second base boundary extends between said third edge and said fourth edge; and
  iv. at least one optical medium between said third surface and said fourth surface, wherein said first and second prisms are arranged in a complementary relationship, so that said first apex is aligned with said second base boundary and said first base boundary is aligned with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light; and
c. at least one curved refractive element operatively associated with said first and second prism, wherein said at least one curved refractive element generates a second aberration in said incident beam of light that at least partially compensates for at least one of said at least one first aberration when said incident beam of light passes through said first prism, said second prism and said curved refractive element, and at least one of paid first and second prisms further comprises:
  i. a sealed periphery between paid surfaces of said at least one of said first and second prism establishing a confinement between said surfaces, wherein said confinement comprises a first orifice that is closed by a flexible membrane; and
  ii. an optical fluid within said confinement.

18. An anamorphic optical system as recited in claim 17, further comprising a cavity proximate to said first orifice, wherein said cavity is external to said confinement, and said cavity comprises a second orifice that vents said cavity to the atmosphere.

19. An anamorphic optical system, comprising:
a. a first prism, wherein said first prism comprises:
  i. a first surface;
  ii. a second surface, wherein a first plane underlying said first surface intersects with a second plane underlying said second surface, and said first and second planes intersect at a first apex;
  iii. a first base boundary, wherein said first surface comprises a first edge that is distal to said first apex, said second surface comprises a second edge that is distal to said first apex, and said first base boundary extends between said first edge and said second edge; and
  iv. at least one optical medium between said first surface and said second surface;
b. a second prism, wherein said second prism comprises:
  i. a third surface;
  ii. a fourth surface, wherein a third plane underlying said third surface intersects with a fourth plane underlying said fourth surface, and said third and fourth planes intersect at a second apex;
  iii. a second base boundary, wherein said third surface comprises a third edge that is distal to said second apex, said fourth surface comprises a fourth edge that is distal to said second apex, and said second base boundary extends between said third edge and said fourth edge; and
  iv. at least one optical medium between said third surface and said fourth surface, wherein said first and second prisms are arranged in a complementary relationship, so that said first apex is aligned with said second base boundary and said first base boundary is aligned with said second apex, said first and second prism in combination are adapted to provide for anamorphic magnification of an incident beam of light when said incident beam of light passes through said first and second surfaces and said at least one optical medium of said first prism, and said third and fourth surfaces and said at least one optical medium of second prism, and said first and second prism in combination generate at least one first aberration in said incident beam of light;
c. at least one curved refractive element operatively associated with said first and second prism, wherein said at least one curved refractive element generates a second aberration in said incident beam of light that at least partially compensates for at least one of said at least one first aberration when said incident beam of light passes through said first prism, said second prism and said curved refractive element;
d. at least one source of light; and
e. at least one image modulator, wherein said at least one source of light generates a corresponding at least one beam of light, one of said at least one beam of light is modulated by said at least one image modulator so as to form a corresponding modulated beam of light, said modulated beam of light is directed as said incident beam of light through said first prism, said second prism and said at least one curved refractive element, and said at least one image modulator modulates said at least one beam of light with an image signal that is adapted to scale or shift or both scale and shift said incident beam of light so as to compensate for chromatic aberration by at least one of said first prism, said second prism and said at least one curved refractive element.

20. An anamorphic optical system as recited in claim 19, wherein said image signal is adapted responsive to a color of said incident beam of light.

* * * * *